May 17, 1966  R. L. WEIDA ETAL  3,252,149
DATA PROCESSING SYSTEM
Filed March 28, 1963  5 Sheets-Sheet 5

United States Patent Office 3,252,149
Patented May 17, 1966

---

3,252,149
DATA PROCESSING SYSTEM
Robert L. Weida, Whitestone, Edward M. Richards, East Northport, Evelyn Berezin, New York, Jack Knoll, Plainview, and Philip Rosenblatt, Mount Vernon, N.Y., assignors to Digitronics Corporation, Albertson, N.Y., a corporation of Delaware
Filed Mar. 28, 1963, Ser. No. 268,743
33 Claims. (Cl. 340—172.5)

This invention pertains to data processing systems and more particularly to systems for processing data received from ticket issuing machines.

One of the most common of these systems is a parimutuel system employed for servicing transactions or wagers made by spectators at sporting events. Presently available systems are slow operating, have only average reliability, depend on considerable human assistance and have limited versatility. It should be particularly noted that such systems can neither tolerate any down time during the course of wagering by the spectators, nor can it tolerate any errors in the processing of the wagers.

It is a general object of one aspect of the invention related to the problem of down time and reliability to provide an improved parimutuel system.

Briefly in accordance with this aspect of the invention a data processor is provided for processing transactions having a plurality of pairs units. Each of the units of the pair concurrently performs the same functions. However, one unit is the master unit and the other the slave unit. A master selecting means initially selects which unit of a pair of units is the master unit and which is the slave unit. The master selecting means can instantaneously change the slave unit of a pair of units to the master unit of that pair of units whenever it receives an erroneous-transaction indicating signal from the master unit of that pair. Checking means are included in each unit of the pairs for checking for erroneous transaction signals so as to transmit an erroneous-transaction indicating signal to the master selecting means.

Features of this aspect of the invention include: various checking means for detecting erroneous transaction signals; means for deactivating the data processor when the checking means in both units of a pair detect erroneous-transaction signals; means for comparing the results obtained by each unit of a pair for equality so as to deactivate the data processor if an inequality exists; means for synchronizing the units of a pair of units to each other; and means for rendering ineffective the unit of a pair of units which detected erroneous-transaction signals.

It is a general object of another aspect of the invention to provide a more versatile system. Briefly, in view of this a plurality of relatively slow operating ticket issuing machines for transactions.

Briefly, in accordance with this aspect of the invention, scanning means are provided for sequentially and periodically selecting each of the ticket issuing machines for interrogation. Interrogating means transmit an interrogation signal to the selected ticket issuing machine. If the selected ticket issuing machine is prepared to make a transaction it will transmit a selected transaction signal. Means sense for the transmission of the selected transaction signal which if not sensed causes the scanning means to immediately step to another ticket issuing machine for interrogation.

A feature of this aspect of the invention is to insure that succeeding attempted interrogations by the scanning means of a ticket issuing machine which has had its transaction confirmed or rejected do not cause the transmission of redundant selected transaction signals.

It is a general object of another aspect of the invention to provide a more versatile system. Briefly, in view of this aspect of the invention, apparatus is provided for processing sequential multientry transactions such as, but not limited to, daily doubles. The apparatus includes means for insuring that the first entry is first received and only transferred to a storage means and that the second entry is then received. Address generating means only then accept the first entry stored in the storage means and the second received entry to generate a storage address which is used to select a storage register associated with the particular first and second entries.

Other objects, features and advantages of the invention will be apparent from the following detailed description of the invention when read with the accompanying figures wherein.

Figure 1A:
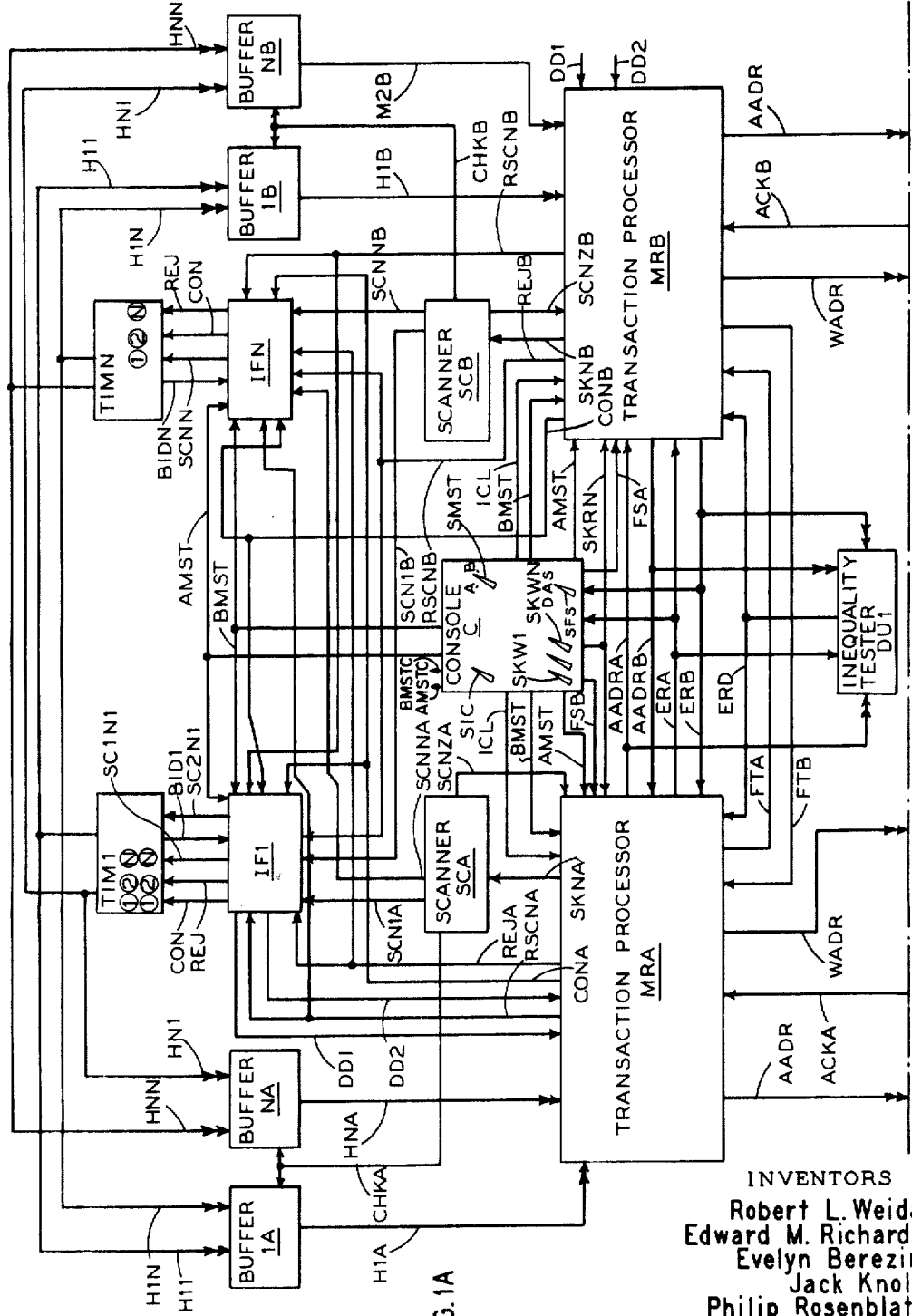
FIGS 1A and 1B show a parimutuel system as an exemplary embodiment of the invention.

The system includes a plurality of ticket issuing machines which accept transactions on entries in a contest such as a horse race. At least one of the ticket issuing machines will handle what is commonly known as a daily double transaction. The transactions are operated upon by a data processor. The data processor includes common units such as a console C, first and second inequality testers DU1 and DU2, and output units OU. The data processor further includes pairs of units such as scanners SCA and SCB, buffers 1A to NA, and 1B to NB, transaction processors MRA and MRB, and transaction calculators TCA and TCB. Generally, the system is set up so that one unit of each pair will operate as a master and the other as a slave. This is called the dual mode. However, it is possible to initially set up the system so that just one unit of each pair operates and the other is idle. This is called the simplex mode.

Each transaction calculator TCA and TCB includes a plurality of registers a portion of which are aggregator registers; aggregated transaction updating means, a computer, an error unit and an acknowledge unit.

The system will be described operating in the dual mode with the A side as the master. It should be noted that the left hand units of the pairs in FIGURE 1 have a reference character terminating with the letter A and these units comprise the A side. Similarly, the right hand side is the B side.

A switch in the console C will generate the AMST and AMSTC signals fed respectively to the transaction processor MRA and the transaction calculator TCA, indicating they are the masters. In addition the AMST signal is fed to all of the interfaces IF1 to IFN so that scanner SCA will control the sequential and periodic interrogation of the ticket issuing machines TIM1 to TIMN. In spite of this fact, scanner SCB will follow along to instantaneously take over in case of emergency as is hereafter more fully described. In any event, each transaction processor MRA and MRB will concurrently process a transaction; i.e. check for erroneous transactions and and other internally generated errors, and generate storage addresses for the memory positions in the ticket issuing machine memory whose contents are to be updated and also the addresses of the aggregator registers in the transaction calculators TCA and TCB whose contents (the aggregated transactions) are to be updated. While both transaction processors MRA and MRB both process the transactions, only the processed transaction information from the master transaction processor is fed to both transaction calculators TCA and TCB. Both the transaction calculators TCA and TCB operate on the processed transaction information to calculate odds, pools, payoffs and similar information. However, because transaction calculator TCA is the master by virtue of the AMSTC signal from console C, only its result information is fed to the various output units OU.

Transaction calculator TCB follows along to immediately take over if there is a failure in transaction calculator TCA. Of course it is understood that side B could equally be the master. Furthermore, there can be a split; i.e. scanner SCA and transaction processor MRA, and transaction calculator TCB being the masters whereas scanner SCB and transaction processor MRB, and transaction calculator TCA being the slaves or vice versa. What should be understood, however, is that while one of the units of a pair controls the flow of information, the other unit of a pair operates both as an on-line standby unit to immediately, either partially or entirely, be switched into the circuit if failures occur in the master unit of the pair and also to perform a check on the master unit of the pair.

All units are connected by signal lines which transfer signals between the units. It should be noted that the signal lines bear the same reference characters as the signals on the lines and that this terminology is used interchangeably. Accordingly, when only the signal has been mentioned, the signal line is implied and vice versa. Furthermore, some signals are shown in a single line for the sake of convenience in spite of the fact that they are a plurality of lines in a cable. The lines AADR, WADR, MOA, MIA, SKNA and SKRN are typical examples. In addition the lines shown only indicate one polarity of this signal such as the BID1' signal. concurrent with this signal line there are instances where there is a parallel signal line carrying the opposite polarity of this such as the BID1' signal.

Switches on the console C determine which side is master, say the A side, by positioning the SMST switch to the A position which generates the AMST and AMSTC signals, initially clear the system (the ICL signal) by momentarily depressing the initial clear switch SIC, and indicate the entries upon which no transactions will be allowed by positioning the appropriate non-transaction switches SKWN which respectively generate the associated non-transaction signals SKRN. These would be "scratches" in a horse race.

The AMST signal fed to the interfaces IF1 ... IFN (only two of which are shown, although there are many) sensitizes these units to interrogating signals such as the SCN1A signal from the scanner SCA and not the scanner SCB although both are simultaneously present at an interface. The AMST signal fed to transaction processors MRA and MRB insures that storage address signals are fed only from the transaction processor MRA to registers MEMA and MEMB and ticket issuing machine memory WM. Similarly the AMSTC signal fed to the transaction calculator TCA insures that only its result information is fed to the output units OU.

The ICL signal fed at least to the transaction processors MRA and MRB preset the scan counters SKA and SKB (a typical one being shown in FIGURE 2) to their initial count of one. The outputs of the scan counters SKA and SKB are fed as the SKNA and SKNB signals respectively from transaction processors MRA and MRB to scanners SCA and SCB. The SKNA and SKNB signals are decoded by the scanners SCA and SCB and become respectively the SCN1A and SCN1B signals which only go to interface IF1. If the ticket issuing machine TIM1, which is the daily double machine, wishes to make a transaction then one of its transaction keys from each bank will be depressed and BID1 signals will be received by the interface IF1 which has no effect at this time. A DD1 signal indicating that this is the first entry of a daily double transaction is fed to the transaction processors MRA and MRB. The scan is now at ticket issuing machine TIM1 for interrogation of the first entry of the daily double transaction. The SCN1A signal passes to the ticket issuing machine TIM1 as an SC1N1 signal which is fed to the common side of all of the transaction-selection switches of the first bank in ticket issuing machine TIM1 (see FIG. 4). This signal will pass through to the other side of the closed transaction selection switch of the first bank and is fed out as a selected transaction HN1 signal to buffers NA and NB (N is actually the number of the entry or the number of the depressed entry key). For example, if the first entry of the daily double transaction is being inserted on entry 1, the entry key 1 of the first bank would have been depressed, causing the closing and latching of the associated transaction-selection switch and an H11 signal would be fed through buffers 1A and 1B to become respectively the particular entry H1A and H1B signals fed to both the transaction processors MRA and MRB respectively. The H1A signal is stored in the entry register 1HRA and also and more particularly in the entry register 2HRA (FIG. 2) under the control of the DD1 signal. The H1B signal is stored in an identical entry register 2HRB (not shown) of transaction processor MRB.

It should be noted that unless specifically indicated otherwise, whatever applies to the transaction processor MRA also applies to the transaction processor MRB, since both of these units are identical and perform concurrent processing steps.

At the same time, control KA (FIG. 2) transmits a test for transaction made TFB signal generated by flip-flop TFBF (FIG. 3) to probe the transaction made unit BMA. If a transaction has been made as indicated by the presence of a signal on one of the HNA lines, a BMD signal is fed back to control KA to start an error test routine. If no BMD signal is fed back, control KA generates a STEP signal to scan counter SKA which steps to the count of 2 to initiate the transaction interrogation of ticket issuing machine TIM2. The detailed operations associated with the STEP signal will be described hereinafter. It should be noted that the HNA signal was derived from the SC1N1 signal passing through a latched transaction switch and if this switch was not latched the STEP signal was generated. Therefore, this is the method for stepping over ticket issuing machines which are not prepared to perform a transaction.

Figure 2:
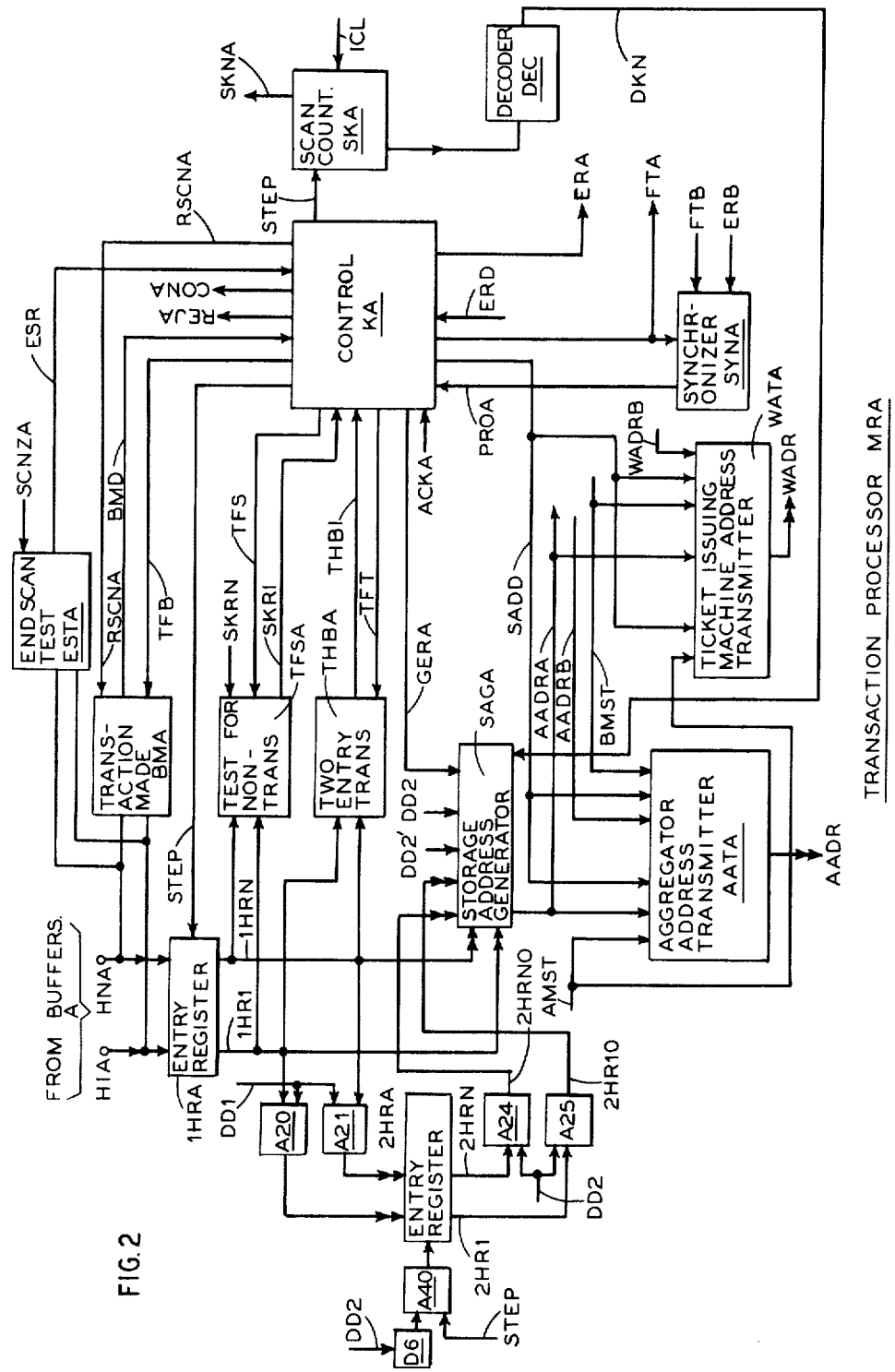
FIG. 2 shows the transaction processor MRA of the system of FIG. 1.
Figure 3:
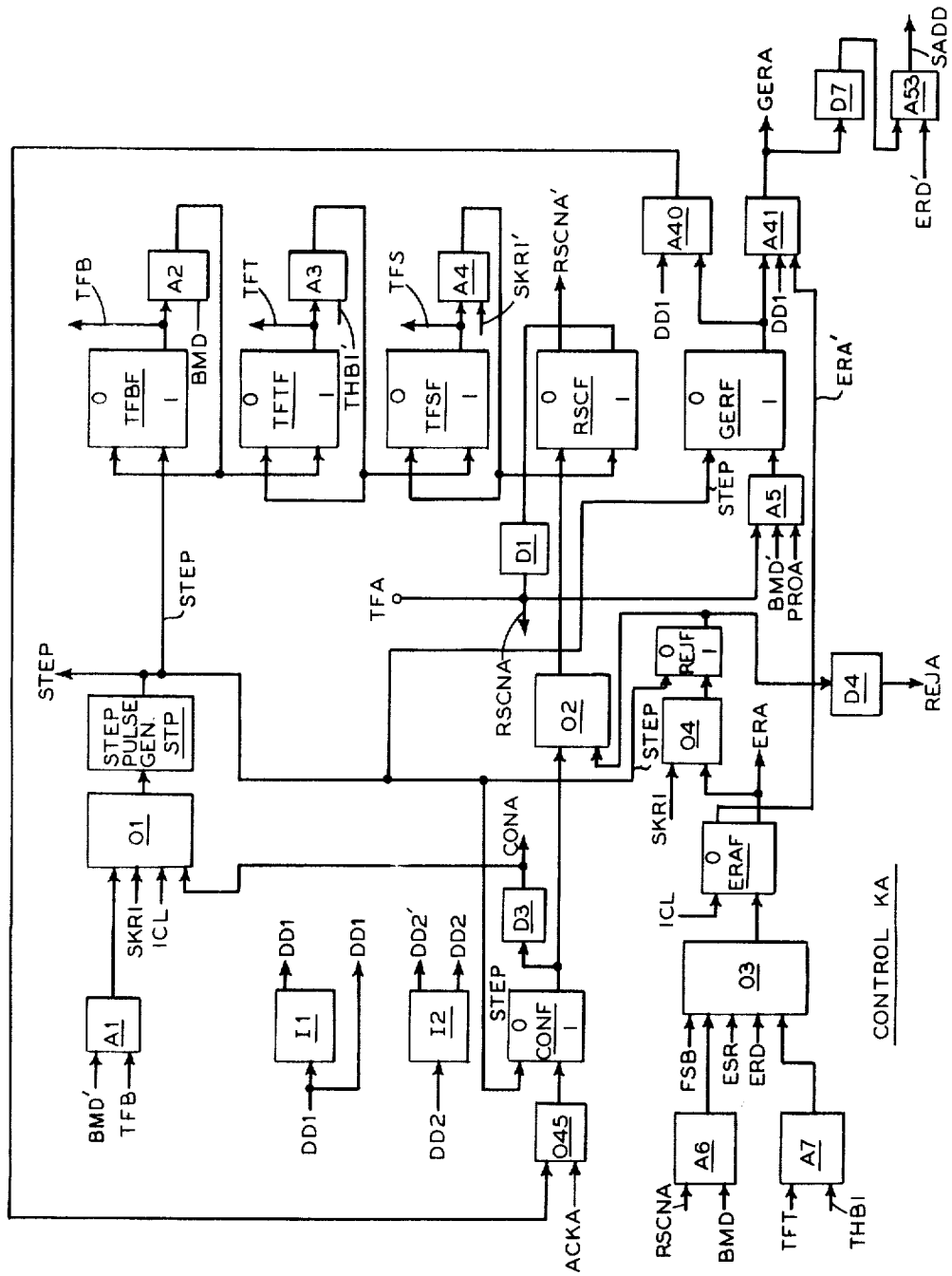
FIG. 3 shows in logical symbols the control KA of the message register MRA of FIG. 2.

However, assume, as we have, that one of the transaction selection switches was latched. Therefore one of the HNA signals is present, causing the transmission of a BMD signal to control KA. Therefore, the error test routine starts. In particular, the presence of the BMD signal at an input of and unit A2 passes a pulse to the set to "1" input terminal of flip flop TFTF which generates the TFT signal and to the set to "0" terminal of flip flop TFBF (FIG. 3). The first test of the error test routine after the test for bet made process step is a two entry transaction test, i.e. a test is made to insure that the signals from entry register 1HRA indicate only one entry is stored therein. It could conceivably happen that ticket issuing machine TIM1 faultily transmitted both the H11 and H21 signals at the same time or that through a failure in the buffers 1A and 2A both the H1A and H2A signals are transmitted to the entry register 1HRA. In such a case, the two entry transaction test unit THBA (FIG. 2) will reply with a THBI signal in response to the TFT signal from control unit KA. If such is the case, control KA sets the error flip-flop ERAF generating the ERA signal (FIG. 3) and generates the REJA signal. The detailed operations of the ERA and REJA signals are hereinafter more fully described. For the time being it is only necessary to know that the REJA signal results in the unlatching of the latched transaction selection key in the ticket issuing machine TIM1 and that the ERA signal will render the message register MRA ineffective. The ERA signal is fed to the transaction processor MRB, inequality tester DU1 and the console C to perform functions which are hereinafter more fully described.

If no such error is detected a THBI' signal is fed to one input of and unit A3 whose output is fed to the set to "0" input of flip-flop TFTF and to the set to "1" input of flip-flop TFSF which generates the TFS signal to test for the selection of an entry upon which no transaction will be accepted is now made. This is in racing parlance a scratch test. The signal representing the entry stored in the entry register 1HRA (FIG. 2) is fed as one of the 1HRN signals to the test for non-allowed transaction unit TFSA and are compared with the non-transaction signals SKRN from console C. The TFS signal from control KA probes for equality which if it exists causes the return of a SKRI signal to control KA which generates a REJA signal. It also causes the generation of an STEP signal fed to scan counter SKA for stepping the scan to the ticket issuing machine TIM2. If no non-allowed transaction is detected the next error processing step is performed. In particular, a SKRI' signal is fed to one input of and unit A4 whose output is fed to the set to "0" input of flip-flop TFSF and the set to "1" input of flip-flop RSCF which generates the RSCNA' signal. This starts the false entry test which ensures that the signal on one of the lines HNA truly resulted from the depressing of an entry key. The signal RSCNA' is fed from transaction processor MRA to all the interfaces. However, since the scan is at ticket issuing machine TIM1 (the SCN1A signal), it passes through interface IF1 where it terminates the generation of the SC1N1 signal (see FIG. 4). It will be recalled that the SC1N1 signal was the interrogating signal which passed through the latched transaction selection switch causing transmission of signals through buffers 1A to NA and 1B to NB to indicate which entry a transaction was being made upon. Therefore none of the lines HNA should carry a signal when the SC1N1 signal is absent. After a delay to permit the passage of signals through the loop including the ticket issuing machine TIM1, the RSCNA signal is fed to the transaction made unit BMA (FIG. 2). At this time if no signals are on the lines HNA a BMD signal is not generated. If however the BMD signal, indicating one of the HNA signals must be present, is generated, control KA will receive this signal which causes the setting of the error flip-flop ERAF and the generation of the ERA and REJA signals in the usual manner.

During this test a synchronizing operation is performed. It will be recalled that in the case under discussion, the A side is the master but the B side follows along. Therefore, it is necessary to keep the scanners SCA and SCB in step so that if the A side (master) drops out the B side picks up exactly where the A side left off. Therefore, since there may be some differences in the time to perform the error processing by each of the transaction processors MRA and MRB because there is no overall master synchronization, these processors are synchronized to each other. It should be noted that an overall master synchronization would defeat the independency of the sides. Therefore, when either transaction processor completes a test routine it generates a signal indicating this fact. For example, after tests are made for test for bet made, the test for two-entry transaction, and the test for non-allowed transactions and concurrent with the test for a false entry transaction, the test-finished TFA signal is generated by control KA (FIG. 3) and is fed to the synchronizer SYNA (FIG. 2). The TFA signal is also transmitted to the analogous synchronizer SYNB in the transaction processor MRB. When the transaction processor MRB reaches this same point, it transmits the TFB signal to the synchronizer SYNA. At this time, the coincidence of the TFA and TFB signals cause the generation of a PROA signal which is fed to the control KA to initiate the next processing step. Although for the sake of simplicity this synchronization is shown as taking place at only one processing step, it preferably occurs at each of the processing steps. In this manner the scanners SCA and SCB stay in step. However, if an error occurs in a transaction processor, it will be rendered ineffective. Therefore it will not generate succeeding test or step-finished signals, but since it generates an error signal this signal is used to replace the test-finished signal. For example, assume transaction processor MRB detected an error. It would "shut down" and start generating the ERB signal. The ERB signal is received at synchronizer SYNA and replaces the TFB signal. Therefore, a PROA signal will be generated whenever a TFA signal is generated. After all these error tests have been completed, a GERF flip-flop is set (FIG. 3). In particular, the coincidence of the PROA signal, the BMD' signal (indicating that there has been no false entry) and the RSCNA signal (the delayed "1" output of the RSCF flip-flop) at inputs to and unit A5 set the GERF flip-flop to "1." The "1" output of the GERF flip-flop is passed via and unit A40 because of the presence of the DD1 signal and is fed by the or unit O45 to the set to "1" input of the CONF flip-flop. The "1" output of the CONF flip-flop passes through or unit O2 to the set to "0" input of the RSCF flip-flop which again generates the RSCNA' signal which is fed to the interface IF1 to regenerate the SCN1 signal (see FIG. 4). Although the SCN1 signal passes through and unit A13 to again cause the generation of the SC1N1 signal which causes an entry to be accepted by entry register 1HRA as described before, it should be noted that this is the same entry as before, so it makes no difference. The "1" output of the CONF flip-flop passes through delay unit D3 to become the CONA signal which is also fed to interface IF1. The CONA signal passes through and unit A90 to an input of or unit O90. The output of or unit O90 is fed via and unit A15 (FIG. 4) to the set to "1" input of the daily double flip-flop DDF. The "1" output is gated by the BID1 signal at and unit A70 causing the generation of the DD2 signal and the "1" output gates the SCN1 signal through the and unit A14 to the delay unit D11. Delay unit D11 delays the generation of the SC2N1 signal which is used to probe the second bank of transaction selection switches. However, because of the delay, the sampling has no effect because the DD1 signal is no longer present when the SC2N1 signal is generated. The absence of the DD1 signal at and units A20 and A21 in FIG. 2 prevents the passage of the second entry into the entry register 2HRA.

The CONA signal is also fed via and unit A90, or unit O90 and and unit A61 to the set to "1" input of the CONAF flip-flop. Since the "1" output of the CONAF flip-flop is delayed by delay unit D7, the DD1 signal disappears before this "1" output reaches and unit A80, therefore no CON signal is generated at this time.

Figure 4:
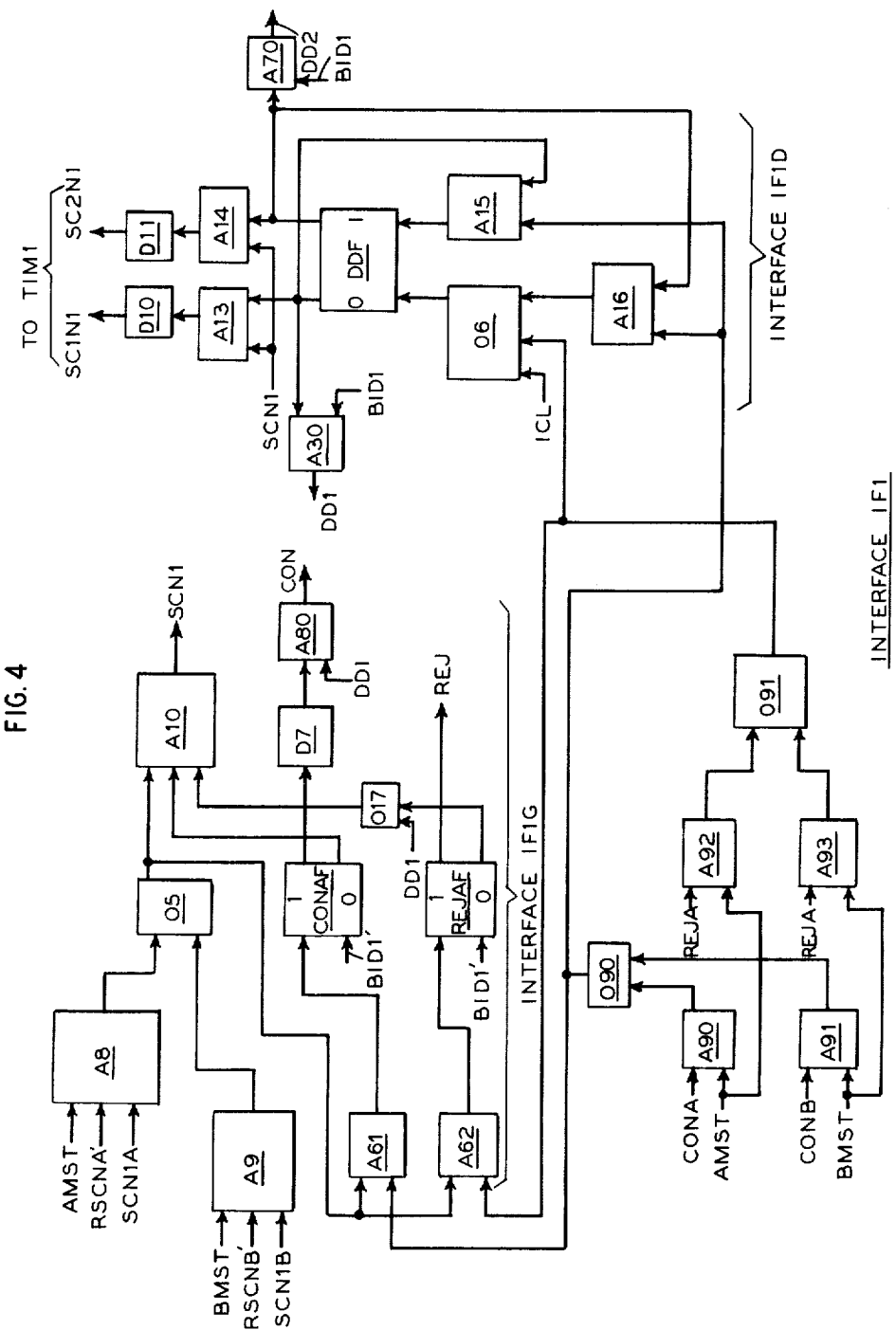
FIG. 4 shows the interface IF1 of the parimutuel system of FIG. 1.

The CONA signal passes through or unit O1 (FIG. 3) to trigger the step pulse generator STP which is a conventional delay multivibrator to generate the STEP signal which accordingly occurs after the CONA signal. Therefore the scan counter SKA steps to a count of 2 so that the ticket issuing machine TIM2 may be interrogated. When the scan steps off ticket issuing machine TIM1 the BID1 signal terminates, causing the generation of the BID1' signal which is connected to the set to "0" inputs of the CONAF and REJF flip-flops (FIG. 4).

The step signal STEP clears the entry register 1HRA (FIG. 2) as well as setting the TFBF flip-flop to its "1" state, and the CONF flip-flop, the REJF flip-flop and the GERF flip-flop to their "0" states.

It should be noted that at this point only the first entry of the daily double transaction has been processed. When the scan again returns to the ticket issuing machine TIM1 the second entry of the daily double transaction is processed. When the SCN1 signal is generated as previously described, it passes through and unit A14 to cause the generation of the SC2N1 signal (FIG. 4) which probes the second bank of entry keys causing the second entry to enter the entry register 1HRA in the usual manner. It should be noted that this entry does not pass to the entry register 2HRA (FIG. 2) because of the absence of the DD1 signals at the and units A20 and A21. The same series of processing steps are performed by the process step flip-flops as before until the GERF flip-flop is set to its "1" state. This time the presence of the DD1' signal at and unit A41 causes the "1" output of this flip-flop to become the GERA signal. Note that the "1" output does not pass through the and unit A40 because the DD1 signal is absent.

The GERA signal strobes the storage address generator SAGA (FIG. 2). The storage address generator SAGA is a plurality of and units each having one of its inputs connected to the GERA signal line and other inputs connected to various combinations of the 1HR1 . . . 1HRN, 2HR10 . . . 2HRN0, and DKN signal lines from decoder DEC.

The storage address register SAGA in response to the GERA signal transmits two groups of signals. The first group AADRA1 . . . AADRAM is associated with entry transactions; the second group AADRAM+1 to AADRAN are associated with the ticket issuing machines. These signals are grouped into a cable generalized as an AADRA signal. The AADRA signals are fed to the inequality tester DU1.

It will be recalled that the transaction processor MRB is simultaneously performing the same processing. The AADRA and AADRB signals are checked for inequality by inequality tester DU1 (FIG. 1). If they do not agree then inequality tester DU1 transmits an ERD signal to both transaction processors MRA and MRB. When the controls KA and KB thereof respectively receive this signal they cause the ineffectuation of the transaction processors MRA and MRB respectively and cause the generation of the ERA and ERB signals respectively which are fed to console C, their coincidence being an ambiguity signal which causes the deactivation of the system and gives an alarm.

If, however, these generated storage addresses represented by the AADRA and AADRB signals agree, the ERD signal is not generated and control KA generates the send address signals SADD. In particular the ERD' signal gates the GERA signal delayed by delay unit D7 through and unit A53 (FIG. 3). In FIG. 2 the SADD signal is received by the aggregator address transmitter AATA and ticket issuing machine transmitter WATA. If transaction processor MRA is the master transaction processor as indicated by the AMST signal present at an input to aggregator address transmitter AATA the first and second groups of the storage address signals AADRA pass therethrough to become the aggregator AADR signals. Likewise, the second group of AADRA signals pass through the ticket issuing machine transmitter WATA to becomes the memory position address WADR signals. Similarly, if the B side is the master (the presence of the BMST signals) then the second group of the AADRB signals becomes the WADR signal, and the first and second groups of the AADRB signals become the AADR signals.

From this point onward the operation is no different for a single entry transaction or for a daily double transaction. Therefore, the single entry transaction processing will be described up to this point.

The non-daily double transaction processing, i.e., single entry transaction, is effectively the same as the second entry of a daily double transaction and only the differences will be described. There are no DD1 and DD2 signals generated in the interface IFN of a non-daily double ticket issuing machine TIMN. Therefore, the single entry transaction only enters the entry register 1HRA. Note the DD1 signal is not present at and units A20 and A21 (FIG. 2).

Since the DD2' signal is present and the DD2 signal is not present at inputs of storage address generator SAGA only the 1HR1 to 1HRN signals, and the DKN signals will be included in the AADRA signals.

In the dual mode with both transaction calculators TCA and TCB operating the AADR signal is fed to both registers MEMA and MEMB. The addressing circuitry therein receives the aggregator address signals AADR to select the indicated aggregator register. The contents of the selected aggregator address are read out, recirculated and written back into the same selected aggregator register to update the number of transactions. In particular, for example, the AADR signals when received by the aggregator registers of registers MEMA selects the column associated with the ticket issuing machine and the row associated with the particular entry upon which a transaction is being made. The signals representing the accumulated number of transactions in that aggregator register are read out via MOA signal lines to the updater UAA where the count they represent is updated by 1 and then fed back via the MIA lines to the original aggregator register in registers MEMA. At this time, registers MEMA feed an acknowledgment ACKA signal via amplifier AKA, indicating the transaction has been recorded, to the control KA.

The ACKA signal, whether as a result of a daily double transaction or a single entry transaction, passes through, or unit O45 (FIG. 3) to set the CONF flip-flop to the "1" state and the resulting procedure described for such a condition during the entry of the first entry of the daily double transaction procedure occurs with minor differences. Since the DD1 signal is not present at and unit A80 (FIG. 4) the "1" output of the CONAF passes therethrough to become the CON signal which is fed to the ticket issuing machine under scan causing the unlatching of the switches and the issuing of the ticket receipt. If the daily double ticket issuing machine TIM1 is under scan then the CONA signal also passes via and unit A14 and or unit O6 to the set to "0" input terminal of daily double flip-flop DDF so that it is prepared to receive the first entry of a new daily double transaction at a later time. It should be noted that non-daily double interfaces only include the interface IF1G portion of FIG. 4. Furthermore, the CON signal is taken directly from the "1" output of the CONFA flip-flop. Therefore and unit A80 and delay unit D7 may be deleted.

Of course, all this time, transaction calculator TCB and registers MEMB are performing the same operations resulting in the generation of an ACKB signal fed to transaction processor MRB. However, it should be noted that since the A side is the master the AMAST signal is present at interface IF1 and therefore the CONA signal from transaction processor MRA does the confirming, in spite of the fact that the CONB signal from transaction processor MRB is also fed to the interfaces.

While the entry transaction is being aggregated the specific ticket issuing machine transaction is also aggregated. In particular, the WADR signal is fed to ticket issuing machine memory WM. The specific addressed memory position therein is selected in a manner described above for the registers MEMA and the contents of that addressed memory position are read out on the WO signal lines and fed via the updater UAW and the WI signal lines back to the same addressed memory position in the ticket issuing machine memory WM. In this way, a central check is maintained on the number of transactions made by each ticket issuer. For the sake of simplicity there has been shown only an aggregation of the total transactions made by a ticket issuer. The routine can obviously be refined to also indicate the specific activity on each entry.

The transaction processors MRA and MRB continue in this maner to sequentially interrogate each ticket issuing machine TIMN and process any transactions that are made. Finally, the scan counters SKA and SKB reach a count that is one greater than the number of ticket issuing machines TIMN. Therefore, no ticket issuing machine is interrogated on this step. Instead, the reliability of the buffers NA and NB are tested for short circuit conditions which would effectively prevent transactions on certain entries during certain periods of time. For example, if an element in buffer 1A associated with the line H11 is short circuited and the entry number 1 key of ticket issuing machine TIM1 is depressed while the scanner SCA is pointing to any other ticket issuing machine such as TIMN then this other ticket issuing machine will not be able to have a transaction processed on entry 1.

The test is performed by transmitting the CHKA signal derived from the SCNZA signal generated by scanner SCA to each of the buffers NA. For simplicity, $$CHKA = SCNZA$$

Buffers NA should each transmit a simulated transaction on each entry, i.e. signals should be present in all lines H1A . . . HNA. The lines H1A . . . HNA are all fed to the end scan test ESTA (FIG. 2) and a multicoincidence is tested for by the SCNZA signal. If the multicoincidence is not obtained an ESR signal is fed to control KA causing the generation of the ERA error signal (FIG. 3).

During all the time up to the start of the race the computers COMA and COMB periodically perform calculations on the aggregated transactions to establish interim accounting results such as odds. In particular, each computer has access to the aggregator registers which supply the operands. Error checking, such parity checks, for example, are performed during these calculations. If an error is detected by either transaction calculator it generates an error signal. For example, if transaction calculator TCA detects an error it will become ineffective and cause error unit ERCA to generate a CERA signal. Similarly, for transaction calculator TCB. If transaction calculator TCA is the master as indicated by presence of the AMSTC signal from console C and transaction calculator TCB detects an error, it becomes ineffective but there is no change of master and slave. It should be noted though that the CERB signal is generated. If, however, transaction calculator TCA detects the error, the CERA signal when received by console C terminates the AMSTC signal and generates the BMSTC signal making computer B the master. The CERA and CERB signals are also fed to inequality tester DU2. The presence of either of these signals disables inequality tester DU2.

In any event, if there is no calculator error when an output is desired each transaction calculator TCA and TCB transmits the result information via the lines POUA and POUB to the inequality tester DU2 where an inequality check is performed. If an inequality in the result information is found, inequality tester DU2 generates the CERD signal which is fed to both errors units ERCA and ERCB which generate the CERA and CERB signals respectively. The coincidence of the CERA and CERB signals is an ambiguity signal to console C which deactivates the system. If equality is found, then the master transaction calculator, in the case under discussion, transaction calculator TCA, transmits the output information to the output units OU.

The effect of the setting to "1" of the error flip-flop ERAF will now be discussed. The error flip-flop ERAF will be set to "1" if: there is a false entry error indicated by coincidence of the RSCNA and BMD signals at inputs of and unit A6; there is a two entry error indicated by the coincidence of the TFT and THBI signals at inputs of and unit A7; a short circuit in one of the buffers BNA as indicated by the ESR signal from end scan test unit ESTA; an inequality error indication (the ERD signal) from inequality tester DU1; or when an FSB signal is received from console C indicating simplex mode with only the B side operative. The outputs of and units A6 and A7 and the FSB, ESR and ERD signals feed inputs of or unit O3 whose output is connected to the set to "1" input of error flip-flop ERAF. The setting of the error flip-flop ERAF at any time causes the transaction processor MRA to be ineffective, i.e. "drop out." The ERA signal is sent to console C, which, if an ERB signal is not received from transaction processor MRB, will terminate the generation of the AMST signal only if the A side is the master and start the generation of the BMST signal. (If the B side is the master, as indicated by the generation of the BMST signal, the BMST is still generated.) In such a case, i.e. the A side is master, at least a portion of the B side, that is, the scanner SCB and the transaction processor MRB will become the master and carry on, and the scanner SCA and transaction processor MRA will perform no effective function in the operation. If any time thereafter the ERB signal is received by console C the system is deactivated. In other words, even if the inequality tester DU1 does not detect an inequality it is possible for the system to shut down. This can occur when the master detected an error and the slave took over, and then the slave detected an error; or when the slave first detected an error and then the master detected an error. This is known as a joint error. The ERA signal is fed also to the transaction processor MRB and to the inequality tester DU1. Generally, the ERA signal fed to the inequality tester DU1 disables it since there will be no further need to perform such a test between the outputs of the transaction processors MRA and MRB. In fact, if this were not done, then the inequality tester DU1 would generate an ERD signal causing the deactivation of the system. Similarly, the ERA signal fed to transaction processor MRB "disables" a synchronizing circuit SYNB therein since synchronization is no longer required between the transaction processors MRA and MRB as heretofore described. The "0" output of the ERAF flip-flop ERA is fed to an input of and unit A41 to prevent the generation of a GERA signal so that no storage address will be generated by the storage address generator SAGA. The ERA' signal will also pass through or unit O4 to the set to "1" input of the REJF flip-flop to initiate a reject routine.

The effect of the REJA signal will now be described. The REJF flip-flop will be set to "1" whenever the non-allowed transaction signal SKRI or the error signal ERA is generated (see FIG. 3). The ERA signal and the SKRI signal are fed via or unit O4 to the set to "1" input of REJF flip-flop. The "1" output thereof is fed via or unit O2 to the set to "0" input of the RSCF flip-flop causing the generation of the RSCNA' signal which is fed to interface IF1 (FIG. 4), for example. This signal will pass via and unit A8 and or unit O5 to one input of and unit A62. The "1" output of REJF flip-flop passes through delay unit D4 to become the REJA signal (FIG. 3) which is also fed to interface IF1. Signal REJA passes via and unit A92 and or unit O91 to the second input of and unit A62 whose output is connected to the set to "1" input of the REJAF flip-flop causing the generation of the REJ signal which is fed to ticket issuing machine TIM1 to unlatch the latched switch. The output of or unit O91 is also fed via or unit O6 to the set to "0" input terminal of daily double DDF flip-flop to prepare it to generate the DD1 signal when a daily double transaction is to be made.

There will now be discussed the generation of the STEP signal when: there is no error; and when no CONA signal has been generated as a result of the valid processing of the first entry of a daily double transaction or the valid processing of any transaction resulting in the issuance of a ticket receipt. If no transaction is sensed or if a non-allowed transaction is sensed it is necessary to step to the next ticket issuing machine without any further processing. The first case is indicated by the presence of the BMD' and TFB signals at inputs of and unit A1 whose output feeds or unit O1. The second case is indicated by the presence of the SKRI signal at a second input of or unit O1. The output of or unit O1 when it transmits a signal in response to a signal received by one of its inputs will cause step pulse generator STP to generate a STEP signal in the usual manner. The role of the STEP signal has been described above.

It should be noted that the scanning is electronically performed and proceeds at high speed whereas the ticket issuing machines are electromechanical and therefore relatively low speed devices. To insure utilization of the high speed scanning rates the scanners SCA and SCB do not wait until the unlatching of transaction selection switches and the ticket printing is performed before stepping, but, instead, step immediately after initiating these operations. Accordingly, it is possible for the scanners to return to such a ticket issuing machine before the unlatching is complete. Therefore, if no provisions are taken a new transaction will start. Provisions for the prevention of such an error will be described for ticket issuing machine TIM1, which is typical.

Accordingly, it should be noted that as long as a transaction selection switch is latched the BID1 and BID1′ signals are generated. It should also be recalled that when the scan stepped at least one of the CONAF or REJAF flip-flops was in the "1" state (see FIG. 4). Therefore, when the SCN1A signal is generated it will pass through or unit O5 to one input of and unit A10 whose other two inputs are connected respectively to the "0" outputs of the CONAF and REJAF flip-flops. If either is set to "1" then and unit A10 will not pass an SCN1, and accordingly no interrogating signal is generated. Therefore, no signals will be on any lines H1A to HNA and the transaction made unit BMA when tested as previously described will not send back a BMD signal to control KA which will immediately generate a STEP signal moving the scan to ticket issuing machine TIM2. In this manner, the rapidly moving scanners can move past the slow operating ticket issuing machines without registering erroneous duplications of the transactions. However, when the transaction switch is finally unlatched the BID1′ signal sets the CONAF and REJAF flip-flops (whichever was set to "1" because of a reject or confirm) to the "0" state. The next time the scan reaches ticket issuing machine TIM1 an interrogation will be performed. However, during a daily double transaction, after the first entry is processed the transaction switches will remain latched and remain so until after the second entry is processed. Therefore, the DD1 signal is fed to one input of or unit O17 to override the effect of the "0" output of the CONAF flip-flop.

DESCRIPTION OF THE ELEMENTS OF THE SYSTEMS

Daily double ticket issuing machine TIM1 may be of the type which includes two banks of entry keys each associated with a different entry. Each of these keys when depressed closes a transaction selection switch which latches. Each of the switches is effectively of the single-pole single-throw type having a moving contact electrically connected to a common input line, and a fixed contact connected to a selected output line such as line H11. The common input line for the first bank is the SC1N1 signal line and the common input line of the second bank is the SC2N1 signal line. The outputs of similar transaction selection switches of each bank are connected together to the same output lines. It should be noted that non-daily double ticket issuing machines have only one bank of entry keys and associated transaction selection switches. Such machines receive only the SCN1 signals. Ganged to all these switches is a bid switch which generates BID1 and BID1′ signals as long as any transaction selection switch is latched. Included in the ticket issuing machine is an electromechanical ticket issuing and printing mechanism which is energized by the confirming CON signal to print and issue a ticket and unlatch any transaction selection switches. There is also electromechanical means for unlatching the switches upon receipt of a reject REJ signal.

A typical buffer 1A for entry 1 includes the logical elements which satisfy the Boolean equation:

$$(H11 + H12 \ldots H1N + CHKA) = H1A$$

where N is associated with the ticket issuing machine TIMN.

A typical scan counter SKA is a chain of conventional cascaded binary counters wherein each binary counter has an output from both its "1" and "0" sides such as those shown in the section entitled Binary Counting, starting on page 194 of "Arithmetic Operations in Digital Computers" by R. K. Richards, published by Van Nostrand, New York in 1955. The output of the first counter would be SK1A and SK1A′, etc. These lines are generalized in a single cable referred to as SKNA.

The typical scanner SCA is a decoder which decodes the combinations of "1's" and "0's" from the scan counter SKA. It may be of the type shown in the section entitled Matrices starting at page 71 of the book "Arithmetic Operations in Digital Computers" wherein FIG. 3–3(a) is suitable when extended to the appropriate number of binary counters in scan counter SKA. It should be noted that each letter A, B or C in FIGURE 3–3(a) is associated with a different binary counter stage, i.e., A is associated with the first binary counter stage, B the second, etc. and where an unbarred letter (A) is the "1" output of the binary counter and the barred letter ($\overline{A}$) is the "0" output of the binary counter. In the terminology used herein $\overline{A} = A'$.

The console C includes at least a plurality of transaction prevention switches SKW each associated with a different entry upon which no transactions will be accepted. For example, if entry 1 is to be excluded then the appropriate switch SKW1 is closed to transmit a non-transaction signal on the line SKR1 of the SKRN signal line cable. The console C further includes an initial clear switch which generates an ICL signal for clearing various control elements as well as clearing the scan counters SKA and SKB to a start count. The master determining means may be two flip-flops such as the type shown in FIG. 2–15(a) on page 48 of said "Arithmetic Operations in Digital Computers" book, may be employed to generate the AMST and BMST signals, and the AMSTC and BMSTC signals. In one case the "1" output generates the AMST signal and the "0" output the BMST signal. The left hand input (the set to "0" input) receives the ERA signal and the right hand input (the set to "1" input) the ERB signal. These inputs will normally initially receive a signal from a switch for setting up the A master or B master modes. The other case for generating the AMSTC and BMSTC signals is analogous. A logical element such as an and unit will sense for the coincidence of the ERA and ERB signals (the coincidence of these signals can be considered the ambiguity signal) for deactivating the system and giving an alarm. Similarly an and unit is included to test for the coincidence of the CERA and CERB signals (an ambiguity signal) to deactivate the system and give an alarm. The console also includes a three position mode switch SFS which: when in the D position indicates the dual mode; when in the A position causes the generation of the FSA signal indicating simplex mode with A the master; and when in the B position generates the FSB signal indicating simplex mode with B the master.

Inequality tester DU1 is essentially a conventional equality comparator which is disabled by the presence of either the ERA or ERB signals. There are innumerable appropriate types available in the existing art.

For example, a logical element satisfying the following Boolean equation can be employed:

$$[ERA' \cdot ERB'] \cdot [(\Sigma AADRAN \cdot AADRBN') + (\Sigma AADRAN' \cdot AADRBN)] = ERD$$

where the summation is for all values of N which are the separate output lines of aggregator address generators. The ERD signal is also fed to an inverter to generate the ERD′ signal.

Inequality tester DU2 is a logical element which satisfies the following Boolean equation:

$$[(CERA' \cdot CERB')] \cdot [(POUA' \cdot POUB) + (POUA \cdot POUB')] = CERD$$

The CERD signal is also fed to an inverter to generate the CERD′ signal.

The registers MEMA and MEMB are identical and include a multiplane magnetic core matrix which is divided into rows and columns wherein the core in each plane in the same row and column provides a bit storage for a multibit binary number. A group of the registers (aggregator registers) is reserved for aggregating transactions. Other registers are reserved for storing opeation and result information of the computer COMA. Included with the registers are typical row and column selectors as well as read and write amplifiers.

Consider now the aggregator registers. Each row of matrix associated with the aggregator registers may be assigned to a different entry and each column to a different ticket issuing machine. Therefore, the AADR signal lines are actually a plurality of lines divided into two groups. The first group are lines associated with the outputs of the particular entry being made and are coupled respectively to the rows. The second group are a plurality of lines associated with the ticket issuing machine being processed. Of course, this can be refined so that each row is associated not with a particular ticket issuing machine but instead with the same category of transaction. For example, in a horse race pari-mutuel system, one row can be associated with all $2 win bets, another row with all $10 place bets, etc. This is a simple matter since each ticket issuing machine generally handles only one such type of bet. Under control of a read signal the bits of the number will be read out of the selected aggregator register as signals on the sense windings connected to the MOA signal lines; passed through a means for updating and returned to the same selected aggregator register under control of a write signal. Such recirculation type magnetic core matrices are well known. For example, typical magnetic core storages may be found in chapter 8 of the book "Digital Computer components and Circuits" by R. K. Richards, published by Van Nostrand, New York, in 1957; or the memory shown in the copending application, Serial No. 223,-481, filed Sept. 13, 1962, for an "Information Transfer System" and assigned to the same assignee.

The means for generating the acknowledge signal can be a logical element satisfying the following Boolean equation:

$$MIA1 + MIA2 + \ldots + MIAN = ACKA$$

Of course more detailed circuits which include error checking could be employed.

The ticket issuing machine memory WN is a similar multiplane magnetic core matrix and associated units except its matrix may be considered as having a single row. Of course it can have many rows, each associated with different entries.

All the updating means are unit adders which are similar and many are available in the present art. For example, the binary adder shown in FIG. 4–1 of said book "Arithmetic Operations in Digital Computers" can be slightly modified to serve the purpose. In said figure, lines $X_3$, $X_2$, $X_1$ are equivalent to the outputs of the sense windings of the magnetic core planes as represented by the MOA signal lines and the signals $S_3$, $S_2$, $S_1$ are equivalent to the MIA signals lines. The $Y_1$ signal line is always maintained at binary "1" while the $Y_2$ and $Y_3$ signal lines are always maintained at binary "0."

The computers COMA and COMB are identical and may be considered as internally programmed general purpose computers which can perform the necessary arithmetic operations such as odds computations on the aggregated transactions to produce result information such as pay offs. It should be noted that the computers also generate addresses to select the aggregator registers in addition to its own registers. The computers may include conventional parity checking circuits for generating parity error indicating signals as typical error signals. The typical error unit CERA may be a flip-flop as described above wherein the "1" output generates the CERA signal and the "0" output the CERA' signal. The left hand input would be connected to the ICL line and the right hand input connected to the output of an or unit whose inputs are respectively connected to the CERD signal line and FSB signal line.

The output units can take many forms such as visual display boards, line printers, magnetic tape units, etc.

Since the transaction processors MRA and MRB are identical only transaction processor MRA will be described. The entry register 1HRA can be a plurality of flip-flops like those previously described. The left hand input of each of these flip-flops is connected to the STEP signal line. The right hand input of each of the flip-flops is connected to one of the particular transaction signal lines HNA. The "1" output of each flip-flop is connected to one of the 1HRN signal lines. The "0" output of each flip-flop is connected to one of the 1HRN' signal lines. The entry register 2HRA is similar to the entry register 1HRA, except the left hand inputs of the flip-flops are connected to the output of and unit A40 (FIG. 2); the right hand inputs are connected via the typical and units A20 and A21 to the 1HR1 . . . 1HRN signal lines. The "1" outputs of the flip-flops are connected respectively to the 2HR1 . . . 2HRN lines.

The end scan test unit ESTA may be a logical element satisfying the following Boolean equation:

$$H1A \cdot H2A \cdot \ldots \cdot HNA \cdot SCNZA = ESR$$

The transaction made unit BMA may be a logical element satisfying the following Boolean equation:

$$(H1A + H2A + \ldots HNA) \cdot (TFB + RSCNA) = BMD$$

The BMD signal is fed to an inverter to generate the BMD' signal.

The test for non-transaction unit TFSA is a conventional equality comparator which when strobed by the TFS signal will transmit a SKRI signal if an equality exists. Such a comparator could be a logical element satisfying the Boolean equation:

$$(\Sigma 1HRN \cdot SKRN) \cdot TFS = SKRI$$

where the summation is over all values of N. The SKRI signal is fed to an inverter to generate the SKRI' signal.

The two entry transaction unit THBA can be a conventional majority logical element which will transmit a THBI signal when interrogated by a TFT signal if at least two of the 1HRN signals are coincidently present.

If a majority logical element is inconvenient then a logical element which satisfies the following Boolean equation may be employed:

$$TFT \cdot \{[1HR1 \cdot (1HR2 + \ldots + 1HRN)] \\ + [1HR3 + \ldots + 1HRN)] + [1HR3 \cdot (1HR4 \\ + \ldots + 1HRN)] + \ldots \\ + [1HR (N-1) \cdot 1HRN]\} = THBI$$

The THBI signal is fed to an inverter to generate the THBI' signal.

The storage address generator SAGA will be described for only the case of two possible entries solely for simplicity. In such a case, consider races with only entry 1 and entry 2.

The Boolean equations are for group 1:

$$GERA \cdot 1HR1 \cdot DD2' = AADRA1$$
$$\ldots = \ldots$$
$$GERA \cdot 1HR2 \cdot 2HR10 \cdot DD2 = AADRA6$$

for group 2

$$GERA \cdot DK1 = AADRA7$$
$$\ldots = \ldots$$
$$GERA \cdot DKN = AADRA(N-6)$$

where in DKN, N implies the different outputs of decoder DEC.

The decoder DEC is similar to scanner SCA.

The aggregator address transmitter AATA is a logical element satisfying the Boolean equations:

(1) $(AADRA1 \cdot SADD \cdot AMST) + (AADRB1 \cdot SADD \cdot BMST) = AADR1$ $\ldots$ (M) $(AADRAM \cdot SADD \cdot AMST) + (AADRBM \cdot SADD \cdot BMST) = AADRM$ (M+1) $(AADRAM+1 \cdot SADD \cdot AMST) + (AADRBM+1 \cdot SADD \cdot BMST) = AADRM1$ $\ldots$ (N) $(AADRAN \cdot SADD \cdot AMST) + (AADRBM \cdot SADD \cdot BMST) = AADRN$ The equations (1) to (M) are associated with group 1 and the equations (M+1) to (N) are associated with group 2.

The ticket issuing machine address transmitter WATA is a logical element satisfying the following Boolean equations.

(1)

$(AADRAM+1 \cdot SADD \cdot AMST) + (AADRBM+1 \cdot SADD \cdot BMST) = WADR1$ $\ldots$ (N-M) $(AADRAN \cdot SADD \cdot AMST) + (AADRBN \cdot SADD \cdot BMST) = WADR(N-M)$ One further comment should be made about the logical elements in the Boolean equations. The symbol "+" implies an or function, the symbol "·" implies an and function and a primed signal implies logical inversion. Many logical elements are available to perform these functions. Typical circuitry for these elements may be found in FIG. 2-2 of said "Arithmetic Operations of Digital Computers" book. In fact, chaper 2 of said book teaches the conversion of Boolean equations to logical elements and the conversion of the logical elements to circuit elements.

The "or" circuit therein can be used for the or units mentioned throughout the specification. The "and" circuit therein can be used for the and units mentioned throughout the specification. In either case non-inverting convention amplifiers may be connected to the outputs of these units when power amplification is required. When both signals and their inverses are simultaneously required then it may be desirable to employ conventional paraphase amplifiers. The inverters can be conventional signal inverters for inverting direct-current signals. The delay units can be conventional delay elements such as lumped constant delay lines or even delay multivibrators.

Further since the various elements shown in the system are made up of standard components, and standard assemblies, reference may be had to "High Speed Computing Devices," by the staff of Engineering Research Associates, Inc., McGraw-Hill Book Company, Inc., 1950; and appropriate chapters in "Computer Handbook," McGraw-Hill, 1962; edited by Harvey D. Huskey and Granino A. Korn, and for detailed circuitry, to for example "Principles of Transistor Circuits," edited by Richard F. Shea, published by John Wiley and Sons, Inc., New York, and Chapman and Hall, Limited, London, 1953 and 1957. In addition, other references are: for system organization and components: "Logic Design of Digital Computers," by M. Phister, Jr. (John Wiley and Sons, New York); "Arithmetic Operations in Digital Computers," by R. K. Richards (D. Van Nostrand Company, Inc., New York). For circuits and details; "Digital Computer Components and Circuits," by R. K. Richards (D. Van Nostrand Company, Inc., New York).

SUMMARY

The basic system may be summarized as follows: In a system which comprises a plurality of single entry and sequential double entry ticket issuing machines wherein each of said ticket issuing machines comprises:

A plurality of selectively actuatable and latching transaction-selection switches, each associated with a different entry in a race, for transmitting a selected transaction signal associated with the selected entry to an associated output line when the ticket issuing machine receives an interrogating signal, A rejection signal responsive means for unlatching any latched switches, An acknowledgement signal responsive means for issuing a ticket having indicia recorded thereon which is related to a latched switch, and Means for generating a bid signal when any one of said transaction-switches is latched, A data processor having a common units and a plurality of pairs of units, each unit of each pair performing the same function as the other unit but with one operating as a master and the other as a slave, said data processor comprising:

(1) a common console means which comprises
  (a) a plurality of selectively actuatable transaction-prevention switches for generating non-allowed signals associated with entries upon which transactions will not be allowed,
  (b) a master selecting means for selecting which unit of each pair of units is a master and which is a slave and for changing the selection upon receipt of an erroneous-transaction indicating signal from the selected master unit, and
  (c) deactivating means for deactivating the system upon receipt of an ambiguity signal or a joint error signal;

(2) one pair of units consisting of first and second scanning means under the control of step signals each comprising
  (a) interrogating means for simultaneously interrogating sequentially and periodically each of said ticket issuing machines to determine if it is to perform a transaction as indicated by a latched transaction-selection switch, and
  (b) transmitting means for transmitting to the latched switch of a ticket issuing machine with a latched switch an interrogating signal from only the scanning means selected by said master selecting means to be the master scanning means;

(3) first and second pluralities of buffer means, each of said buffer means of each of said pluralities having
  (a) one input line connected to one of the associated output lines of each of said ticket issuing machines, and
  (b) one output line for transmitting a particular transaction signal indicating that a transaction is desired on a particular one of the entries;

(4) a second pair of units consisting of first and second transaction processing means each connected respectively to the output lines of said first and second pluralities of buffer means for concurrently processing said particular transaction signals, each of said transaction processing means comprising
  (a) checking means for checking for erroneous transaction signals and for transmitting an erroneous-transaction indicating signal to said console means so that if the master transaction processing means transmitted said signal, said master selecting means selects the slave transaction processing means to be the master transaction processing means, said checking means comprising
    (i) means for testing for the simultaneous presence of more than one particular transaction signal, and (ii) means for testing for the presence of any particular transaction signals during the absence of said interrogating signals,
(b) comparing means for comparing the particular transaction signals with the non-allowed signals to generate a non-transaction signal and a step signal when a particular transaction signal and a non-allowed signal represent the same entry,
(c) rejection means responsive to an erroneous-transaction indicating signal from said checking means or a non-transaction signal from said comparing means for transmitting a rejection signal to the scanned ticket issuing machine with the latched switch,
(d) no transaction made testing means for testing for the absence of the particular transaction signals during the presence of said interrogation signal for generating a step signal if no particular transaction signals are present,
(e) means responsive to a step signal for advancing the associated scanning means,
(f) synchronizing means for synchronizing processing steps between said first and second transaction processing means comprising
(i) means for transmitting a process step-finished signal to the other transaction processing means when a processing step is finished,
(ii) means responsive to the simultaneous presence of process step-finished signals from both transaction processing means for enabling said transaction processing means to proceed to the next processing step, and
(iii) means responsive to an erroneous-transaction indicating signal from said checking means for disabling said synchronizing means,
(g) generating means for generating storage address signals representing the entry associated with the particular transaction signal and representing the particular ticket issuing machine under interrogation only for non-erroneous particular transaction signals,
(h) transferring means responsive to said master selecting means for transferring said storage address signals as aggregator address signals only from the master transaction processing means,
(i) acknowledgment signal transmitting means for transmitting an acknowledgment signal to the interrogated ticket issuing machine with the latched switch for issuing a ticket,
(j) double entry means responsive to a sequential double entry ticket issuing machine comprising
(i) means for first causing an interrogation signal to first cause the generation of a first particular transaction signal associated with the first of the entries and the generation of a second interrogation signal to cause the generation of a second particular transaction signal associated with the second entry,
(ii) means for storing said first particular entry signal, and
(iii) means for activating said generating means only after said first and second particular transaction signals are generated;
(5) testing means for testing for an inequality of the storage address signals generated by said first and second transaction processing means to transmit an ambiguity signal to said deactivating means.
(a) means responsive to an erroneous-transaction indicating signal from the checking means of either of said first and second transaction processing means for disabling said inequality testing means,
(b) means responsive to erroneous-transaction indicating signals from both of said first and second transaction processing means for transmitting a joint error signal to said deactivating means;

(6) a ticket issuing machine memory comprising
(a) a plurality of addressed memory positions each storing the number of transactions made by a ticket issuing machine,
(b) address-selection means for receiving the portion of the storage address signals generated by the master transaction processing means for selecting the particular memory position associated with the ticket issuing machine being interrogated,
(c) reading means for reading out the contents of the selected memory position,
(d) updating means for updating the read-out contents, and
(e) returning means for returning the updated contents to the selected memory position;
(7) a third pair of units consisting of first and second concurrently operating transaction calculating means each comprising
(a) register means having
(i) addressed aggregation registers for storing the aggregations of transactions processed by only the master transaction processing means, and
(ii) other registers for storing operation and result information,
(b) means responsive to the storage address signals generated by said generating means for selecting the addressed aggregation registers represented by the storage address signals,
(c) means for reading out the contents of said selected addressed aggregation register,
(d) means for updating the contents of said selected addressed aggregation register,
(e) means for returning said updated contents to said selected addressed aggregation register,
(f) means for generating an acknowledgment signal which is transferred to the acknowledgment signal responsive means of the interrogated ticket issuing machine when said updated contents are returned to said selected addressed aggregated register, and
(g) a computer for operating on said aggregated transactions to obtain result information, said computer comprising
(i) means for checking for errors in the calculations for transmitting an erroneous-transaction indicating signal to said console means so that if the master transaction calculating means transmitted said signal, said master selecting means selects the slave transaction calculating means to be the master transaction calculating means, and
(ii) means under the control of said master selecting means for transferring the result information as output information from the master transaction calculating means;
(8) means for testing for an inequality of the result information of said computers for transmitting an ambiguity signal to said deactivating means comprising
(a) means responsive to an erroneous-transaction indicating signal from the computer error checking means of either the first or second transaction calculating means for disabling said computer inequality testing means; and
(b) means responsive to erroneous-transaction signals from both of said first and second transaction calculating means for transmitting a joint error signal to said deactivating means;
(9) information display means for receiving and displaying the output information transferred from said master transaction calculation means; and
(10) means for preventing the reinterrogating of a ticket issuing machine which has received an acknowledgement signal or a rejection signal until the bid signal generated by said ticket issuing machine terminates.
While the system has been described for single entry and daily double transactions, it can easily be modified to handle other multiple entry transactions such as parlays and quinellas in animal racing parlance.

Furthermore, although the processing of a daily double transaction has been described as being performed by two consecutive scan arounds to the same ticket-issuing machine it is equally possible on one scan to interrogate the ticket issuing machine twice to process the transaction before stepping off to the next ticket issuing machine.

It should also be noted that such a system can not only be employed locally to service a single track for all transactions made at that track but can also be employed to service ticket issuing machines located at "off track" installations. Furthermore, the system can be employed to service a plurality of tracks simultaneously both for "on track" and "off track" betting transactions. In such a case, multientry transactions such as parlays need not be restricted to only animals running at the same track.

While only one embodiment of the invention has been shown and described in detail, it will now be apparent to those skilled in the art that many modifications and variations may be made which do not depart from the appended claims.

What is claimed is:

1. A data processor for processing transaction signals comprising:
 (A) a plurality of pairs of units, each unit of each pair performing the same function as the other unit but with one operating as a master unit and the other as a slave unit,
 (B) a master selecting means for selecting which unit of each pair of units is a master and which is a slave and for changing the selection upon receipt of an erroneous-transaction indicating signal only from the selected master unit, and
 (C) checking means responsive to transaction signals being processed in each unit of a pair of units for checking for erroneous transaction signals and for transmitting an erroneous-transaction indicating signal to said master selecting means so that if the master unit caused said erroneous-transaction signal, said master selecting means then selects the slave unit to be the master unit.

2. In a system which comprises a plurality of machines wherein each of said machines comprises a plurality of selectable signal generators for transmitting a selected transaction signal to an associated output line, a data processor for processing transaction signals comprising:
 (A) a plurality of pairs of units, each unit of each pair performing the same function as the other unit but with one operating as a master and the other as a slave,
 (B) a master selecting means for determining which unit of each pair of units is a master and which is a slave and for changing the selection upon receipt of an erroneous-transaction indicating signal from the selected master unit,
 (C) connecting means for connecting said master and slave units respectively to the output lines of said machines for concurrently processing said particular transaction signals, and
 (D) checking means responsive to transaction signals being processed in each unit of a pair of units for checking for erroneous transaction signals and for transmitting an erroneous-transaction indicating signal to said master selecting means so that if the master unit caused said erroneous-transaction signal, said master selecting means selects the slave unit to be the master unit.

3. In a system which comprises a plurality of machines wherein each of said machines comprises a plurality of switches for transmitting a selected transaction signal to an associated output line, a data processor for processing transaction signals comprising:
 (A) a plurality of pairs of units, each unit of each pair performing the same function as the other unit but with one operating as a master and the other as a slave, and
 (B) a master selecting means for determining which unit of each pair of units is a master and which is a slave and for changing the selection upon receipt of an erroneous-transaction indicating signal from the selected master unit,
 (C) one pair of units comprising first and second transaction processing means each connected respectively to the output lines of said machines for concurrently processing said selected transaction signals,
 (D) each of said transaction processing means including checking means responsive to transaction signals being processed in its associated transaction processing means for checking for erroneous transaction signals and for transmitting an erroneous-transaction indicating signal to said master selecting means so that if the master transaction processing means transmitted said signal, said master selecting means then selects the slave transaction processing means to be the master transaction processing means.

4. The apparatus of claim 3 further comprising another pair of units consisting of first and second concurrently operating transaction calculating means each comprising
 (A) addressed aggregation registers for storing the aggregations of transactions, and
 (B) a computer for operating on said aggregated transactions to obtain result information, said computer comprising error checking means for checking for errors in the calculations for transmitting an erroneous-transaction indicating signal to said master selecting means so that if the master transaction calculating means transmitted said signal, said master selecting means selects the slave transaction calculating means to be the master transaction calculating means.

5. The apparatus of claim 4 wherein said first and second concurrently operating transaction calculating means are each responsive only to processed transaction signals transmitted from the master transaction processing means.

6. The apparatus of claim 4 further comprising another pair of units consisting of first and second scanning means each comprising
 (A) interrogating means for simultaneously interrogating sequentially and periodically each of said machines to determine if it is to perform a transaction as indicated by an operated switch, and
 (B) transmitting means for transmitting to the operated switch an interrogated signal from only the scanning means selected by said master selecting means to be the master scanning means.

7. The apparatus of claim 6 wherein said computer further comprises
 (A) transferring means under control of said master selecting means for transferring the result information as output information from the master transaction calculating means, and
 (B) information display means for receiving and displaying the output information transferred from said master transaction calculating means.

8. The apparatus of claim 7 further comprising first and second pluralities of buffer means, each of said buffer means of each of said pluralities having
 (A) one input line connected to one of the associated output lines of each machine, and
 (B) one output line connected to one of the first and second transaction processing means.

9. The apparatus of claim 3 wherein each of said first and second transaction processing means further comprises synchronizing means for synchronizing processing steps between said first and second transaction processing means comprising
 (A) means for transmitting a process step-finished signal from one to the other transaction processing means when a processing step is finished, and (B) means responsive to the simultaneous presence of process step-finished signals from both transaction processing means for enabling said transaction processing means to proceed to the next step.

10. The apparatus of claim 1 further comprising
(A) testing means for simultaneously testing the output data of a pair of units and producing an ambiguity signal when said output data is unequal, and
(B) deactivating means for deactivating the data processor in response to an ambiguity signal.

11. The apparatus of claim 4 further comprising
(A) first testing means for simultaneously testing the processed data from said first and second transaction processing means and producing an ambiguity signal when said processed data is unequal,
(B) second testing means for simultaneously testing the result information produced by said first and second transaction calculating means and producing an ambiguity signal when said result information is unequal, and
(B) deactivating means responsive to an ambiguity signal for deactivating the system.

12. The apparatus of claim 4 wherein each of said transaction processing means further comprises
(A) generating means for generating storage address signals representing the selected transaction and the particular machine under interrogation, and
(B) means responsive to the storage address signals generated by said generating means for selecting the addressed aggregation registers.

13. The apparatus of claim 12 wherein said first and second transaction calculating means each further comprises
(A) means for reading out the contents of the selected addressed aggregation register,
(B) means for updating the contents of said selected addressed aggregation register,
(C) means for returning said updated contents to said selected addressed aggregation register, and
(D) means for transmitting an acknowledgement signal to the master transaction processing means when said updated contents are returned to said selected addressed aggregation register.

14. The apparatus of claim 9 further comprising means responsive to an erroneous-transaction indicating signal from said checking means for disabling said synchronizing means.

15. The apparatus of claim 10 further comprising means responsive to an erroneous-transaction indicating signal from said checking means for disabling said testing means.

16. The apparatus of claim 11 further comprising means responsive to an erroneous-transaction indicating signal for disabling said first testing means if said signal is transmitted by the checking means of either transaction processing means and for disabling said second testing means if said signal is transmitted by the error-checking means of either transaction calculating means.

17. The apparatus of claim 1 further comprising
(A) means responsive to erroneous-transaction signals from each unit of a pair of units for producing a joint error signal, and
(B) deactivating means responsive to a joint error signal for deactivating the data processor.

18. The apparatus of claim 4 further comprising
(A) means responsive to erroneous-transaction indicating signals from both of said first and second transaction processing means for producing a joint error signal,
(B) means responsive to erroneous-transaction indicating signals from both of said first and second transaction calculating means for producing a joint error signal, and
(C) deactivating means responsive to a joint error signal for deactivating the system.

19. The apparatus of claim 3 wherein each of said machines also comprises a rejection device for rejecting a transaction, said apparatus further comprising means responsive to an erroneous-transaction indicating signal transmitted from said checking means for operating said rejection device.

20. A system comprising
(A) a plurality of ticket issuing machines wherein each of said ticket issuing machines comprises
(1) a plurality of selectively actuatable and latching transaction-selection switches each associated with a different entry in a race for transmitting a selected transaction signal associated with the selected entry,
(2) an acknowledgement signal responsive means for issuing a ticket having indicia recorded thereon which is related to a latched switch,
(B) generating means responsive to said selected transaction signal for generating signals representing the entry associated with the particular transaction signal and representing the particular ticket issuing machine, and
(C) transaction calculating means for performing a calculation on said generated signals and transmitting an acknowledgement signal to said acknowledgement signal responsive means for issuing a ticket only if the transaction is correct.

21. The system of claim 20 wherein said transaction calculating means comprises
(A) register means having addressed aggregation registers for storing the aggregations of transactions,
(B) means responsive to the signals generated by said generating means for selecting the addressed aggregation register,
(C) means for reading out the contents of said selected addressed aggregation register,
(D) means for updating the contents of said selected addressed aggregation register,
(E) means for returning said updated contents to said selected addressed aggregation register, and
(F) means for transmitting said acknowledgement signal to the acknowledgement signal responsive means when said updated contents are returned to said selected addressed aggregation register.

22. The system of claim 20 further comprising a ticket issuing machine memory comprising
(A) a plurality of addressed memory positions each storing the number of transactions made by a ticket issuing machine,
(B) address-selection means for receiving the signals generated by said generating means for selecting the particular memory position associated with the particular ticket issuing machine,
(C) reading means for reading out the contents of the selected memory position,
(D) updating means for updating the read-out contents, and
(E) returning means for returning the updated contents to the selected memory position.

23. A system comprising
(A) a plurality of ticket issuing machines wherein each of said ticket issuing machines comprises
(1) a plurality of selectively actuatable and latching transaction-selection switches each associated with a different entry in a race for transmitting a selected transaction signal associated with the selected entry,
(2) a rejection signal responsive means for unlatching any latched switches,
(3) and an acknowledgement signal responsive means for issuing a ticket having indicia recorded thereon which is related to a latched switch, (B) switch means which comprises a plurality of selectively actuatable transaction-prevention switches for generating non-allowed signals associated with entries upon which transactions will not be allowed, (C) comparing means for comparing the selected transaction signal with the nonallowed signals to generate a nontransaction signal when a particular transaction signal and a nonallowed signal represent the same entry, (D) rejection means responsive to a nontransaction signal from said comparing means for transmitting a rejection signal to the rejection signal responsive means of the ticket issuing machine for unlatching any latched switches, and (E) means for transmitting an acknowledgement signal to the acknowledgement signal responsive means of the ticket issuing machine for issuing a ticket only if the selected transaction is allowed.

24. A system comprising:
(A) a plurality of ticket issuing machines each including a plurality of selectively actuatable transaction selection switches each associated with a different entry for transmitting when actuated a selected entry transaction signal associated with a selected entry to an output line when the ticket issuing machine receives an interrogation signal,
(B) scanning means for sequentially and periodically selecting each of the ticket issuing means for interrogation,
(C) interrogating means for generating an interrogation signal for transmission to the selected ticket issuing machine,
(D) sensing means for sensing for a selected entry transaction signal, and
(E) means for stepping said scanning means to the next ticket issuing machine when said sensing means does not sense a selected entry transaction signal.

25. The system of claim 24 further comprising means for processing a selected entry transaction signal sensed by said sensing means before the stepping of said scanning means to select the next ticket issuing machine.

26. A system comprising:
(A) a ticket issuing machine which comprises
(1) a plurality of selectively actuatable and latching transaction-selection switches each associated with a different entry for transmitting a selected entry transaction signal associated with the selected entry to an associated output line,
(2) a rejection signal responsive means for unlatching any latched switches upon receipt of a rejection signal, and
(3) an acknowledgement signal responsive means for issuing a ticket having indicia recorded thereon which is related to a latched switch,
(B) entry checking means for checking for erroneous selected entry transaction signals and for transmitting a rejection signal to said ticket issuing machine when erroneous selected entry transaction signals are sensed, and
(C) means for transmitting acknowledgement signals to said ticket issuing machine when the selected entry transaction signal is correct.

27. The system of claim 26 wherein said entry checking means comprises means for sensing for the simultaneous presence of more than one selected entry transaction signal.

28. The system of claim 26 wherein said ticket issuing machine transmits a selected entry transaction signal only in response to an interrogating signal, said system further comprising interrogating means for producing interrogating signals, said checking means further comprising means for sensing for the presence of a selected entry transaction signal when the interrogating signal is not present.

29. A system comprising:
(A) a plurality of ticket issuing machines each including
(1) a plurality of selectively actuatable and latching transaction selection switches each associated with a different entry for transmitting when latched a selected transaction signal associated with a selected entry when the ticket issuing machine receives an interrogation signal,
(2) means for generating a bid signal as long as any one of the transaction selection switches is latched, and
(3) acknowledgement signal responsive means for issuing a ticket having indicia recorded thereon which is related to the selected entry and for unlatching any latched transaction selection switches,
(B) scanning means for sequentially and periodically selecting each of the ticket issuing means for interrogation,
(C) interrogating means for generating an interrogation signal for transmission to the selected ticket issuing machine,
(D) means for processing the selected transaction signal and for generating an acknowledgement signal for transmission to the selected ticket issuing machine to issue said ticket and unlatch any latched transaction selection switches, and for stepping said scanning means to select the next ticket issuing machine, and
(E) means for preventing said interrogating means from transmitting an interrogating signal to a ticket issuing machine which has received an acknowledgement signal until the termination of the bid signal.

30. The system of claim 29 further comprising
(A) sensing means for sensing for a selected transaction signal, and
(B) means for stepping said scanning means to select the next ticket issuing machine when said sensing means does not sense a selected transaction signal.

31. A system for recording a multientry transaction related to one entry selected from each of two groups of entries comprising:
(A) transaction signal generation means for generating a first entry transaction signal representing the entry selected from the first group of entries and a second entry transaction signal representing the second entry selected from the second group of entries,
(B) storage means responsive to said transaction signal generation means for storing the first entry transaction signal,
(C) address generation means responsive to said transaction signal generation means and said storage means for generating a storage address signal related to the first and second entry transaction signals, and
(D) addressed storage registers responsive to said address generation means for storing the multientry transaction in the particular addressed storage register represented by the storage address signals generated by said address generation means.

32. The system of claim 31 further comprising:
(A) interrogation means for sequentially interrogating said transaction signal generating means, and transaction selection means for first selecting the first entry transaction for interrogation and then selecting the second entry transaction for interrogation,
(B) said storage means being only responsive to said transaction signal generation means when said transaction selection means selects the first entry transaction.

33. The system of claim 32 wherein said address generation means is responsive to said transaction selection means to generate a storage address signal only after said transaction selection means selects the second entry transaction.

References Cited by the Examiner

UNITED STATES PATENTS

| | | | |
|---|---|---|---|
| 2,345,212 | 3/1944 | Nelson | 235—92 |
| 3,029,414 | 4/1962 | Schrimpf | 340—172.5 |
| 3,034,714 | 5/1962 | Helsel et al. | 235—92 |
| 3,047,223 | 7/1962 | Lange | 235—92 |
| 3,051,384 | 8/1962 | Lange | 235—92 |
| 3,061,192 | 10/1962 | Terzian | 235—157 |

FOREIGN PATENTS 749,836  6/1956  Great Britain.

OTHER REFERENCES

Pages 4–1 to 4–4, November 1949, Functional Description of the EDVAC, published by the University of Pennsylvania, Vol. 1.

Pages 101–107, December 1959, Chao: The System Organization of MOBIDIC, Proceedings of the Eastern Joint Computer Conference, No. 16.

Pages 33–78, 1961, Gass: Project Mercury Real-Time Computational and Data Flow System, Proceedings of the 1961 Eastern Joint Computer Conference. Vol. 20. QA 76 E3 C.9.

ROBERT C. BAILEY, *Primary Examiner.*

MALCOLM A. MORRISON, *Examiner.*

P. J. HENON, *Assistant Examiner.*

UNITED STATES PATENT OFFICE
CERTIFICATE OF CORRECTION

Patent No. 3,252,149                              May 17, 1966

Robert L. Weida et al.

Figure 1B:
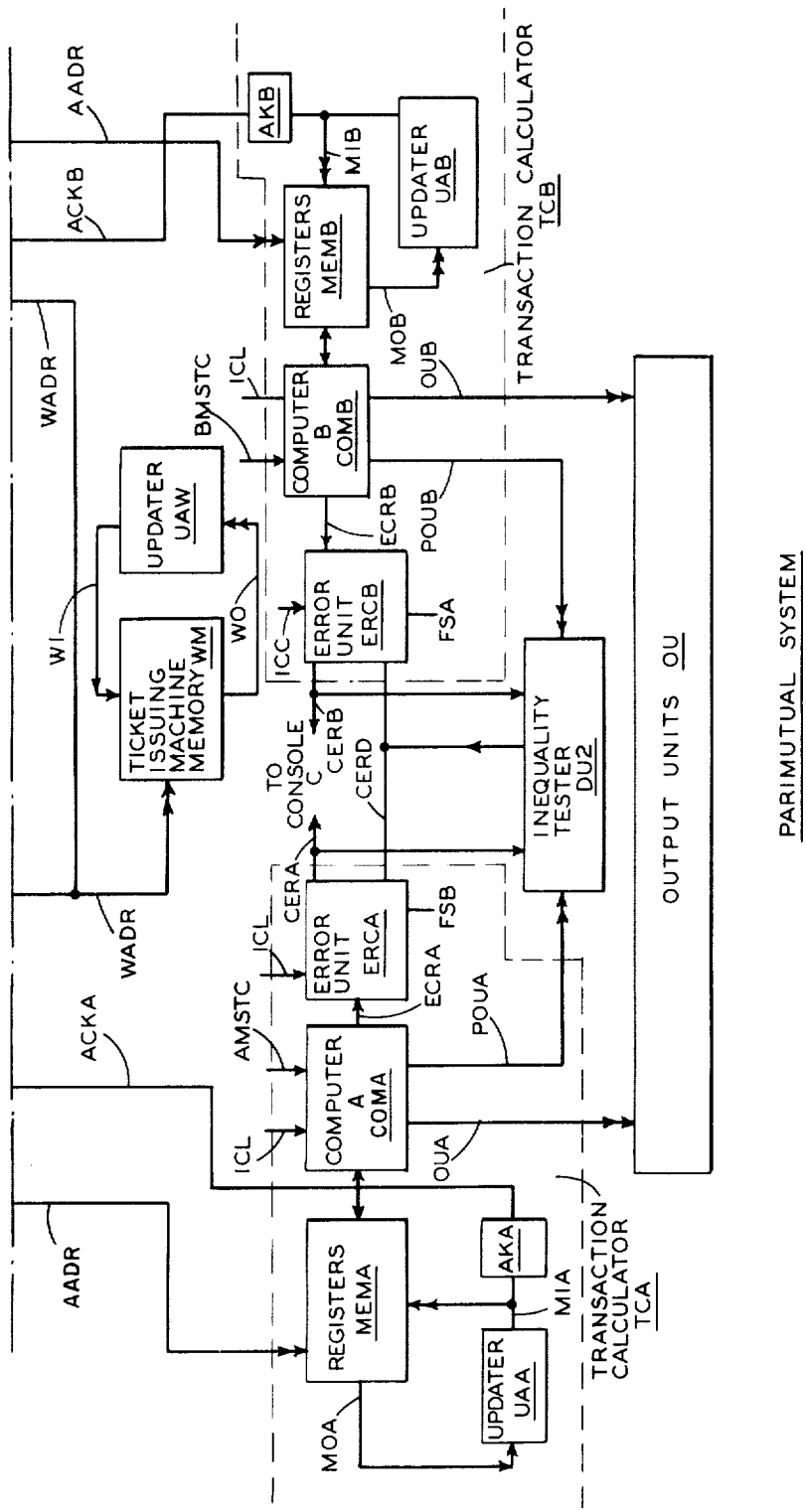

It is certified that error appears in the above identified patent and that said Letters Patent are hereby corrected as shown below:

In the drawings, Figure 1A, change "FTA" to -- TFA --; Figure 1A, change "FTB" to -- TFB --; Figure 1A, change "M2B" to -- HNB --; Figure 2, delete the line connected between line "SADD" and element "AATA"; Figure 2, insert a line connecting line "SADD" and element "WATA"; Figure 2, insert a line connecting line "AADRB" and element "WATA"; Figure 2, change "FTA" to -- TFA --; Figure 2, change "FTB" to -- TFB --; Figure 3, the line DD1 connected to gate A41 should read -- DD1' --. Column 1, line 28, after "pairs" insert -- of --; line 51, "a more versatile system. Briefly, in view of this" should read -- a high speed scanning means for interrogating --. Column 3, line 32, "this signal such as the BID1' signal." should read -- the signal such as the BID1 signal. However, --; line 49, after "not" insert -- the $SCN^1B$ signal from --; line 59, "preset" should read -- presets --. Column 6, line 62, "REJF" should read -- REJAF --. Column 8, line 34, "A14" should read -- A16 --; line 41, "CONFA" should read -- CONAF --. Column 9, line 62, "BNA" should read -- NA --. Column 10, line 28, "ERA" should read -- ERA' --; line 31, "ERA'" should read -- ERA --. Column 12, line 19, "barrel" should read -- barred --. Column 13, line 73, "CERA" should read -- ERCA --. Column 15, line 36, "convention" should read -- conventional --. Column 16, line 15, "units" should read -- unit --. Column 17, line 67, cancel the period and insert --, comprising --.

Signed and sealed this 16th day of December 1969.

(SEAL)
Attest:

EDWARD M. FLETCHER, JR.                      WILLIAM E. SCHUYLER, JR.
Attesting Officer                               Commissioner of Patents